United States Patent
Shakhgildian

(10) Patent No.: US 6,584,325 B1
(45) Date of Patent: Jun. 24, 2003

(54) SUBSCRIBER UNIT AND METHOD OF CELL SELECTION FOR A CELLULAR COMMUNICATION SYSTEM

(75) Inventor: Vagan Shakhgildian, Bath (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/439,452

(22) Filed: Nov. 15, 1999

(30) Foreign Application Priority Data

Mar. 17, 1999  (GB) ............................................. 9906005

(51) Int. Cl.$^7$ ............................. H04B 7/00; H04Q 7/20
(52) U.S. Cl. ....................................... 455/525; 455/522
(58) Field of Search ................................ 455/525, 524, 455/436, 437, 438, 439, 515–517, 67.1, 67.3, 226.1–226.3, 561, 423, 62, 63, 466, 522, 69; 370/331–335

(56) References Cited

U.S. PATENT DOCUMENTS

| | | | |
|---|---|---|---|
| 5,095,500 A | * 3/1992 | Tayloe et al. ............... | 455/446 |
| 5,150,362 A | 9/1992 | Akerberg ..................... | 340/825 |
| 5,159,593 A | * 10/1992 | D'Amico et al. ........... | 370/332 |
| 5,379,447 A | * 1/1995 | Bonta et al. ................. | 455/437 |
| 5,386,589 A | * 1/1995 | Kanai ........................... | 455/423 |
| 5,551,058 A | * 8/1996 | Hutcheson et al. ......... | 455/429 |
| 5,832,368 A | * 11/1998 | Nakano et al. .............. | 455/450 |
| 6,327,472 B1 | * 12/2001 | Westroos et al. ........... | 455/436 |
| 6,473,411 B1 | * 10/2002 | Kumaki et al. ............. | 455/436 |

FOREIGN PATENT DOCUMENTS

| | | |
|---|---|---|
| EP | 0779755 A2 | 6/1997 |
| EP | 0812121 A2 | 6/1997 |
| EP | 0812121 A3 | 12/1997 |
| EP | 0889663 A1 | 1/1999 |

OTHER PUBLICATIONS

A.M. Chen and R.R. Rao "Resource Management for Third Generation Cellular Communication Systems", 1997 IEEE, p. 1832–1836.

* cited by examiner

Primary Examiner—Dwanye Bost
Assistant Examiner—Eliseo Ramos-Feliciano

(57) ABSTRACT

The current invention relates to a cellular communication system. Known communication systems performs cell selection based on measurements of downlink pilot signal levels. However, this is inefficient as uplink conditions can have significant impact on the performance. In the current invention a subscriber unit (300) comprises receiving means (305) for receiving uplink characteristics information transmitted from a target set of base stations (201,203). The subscriber unit (300) further comprises base station selection means (309) for determining at least one serving base station in response to said uplink characteristics information, and transmitting means (311) for accessing the cellular communication system through said at least one serving base station. Preferably, the subscriber unit (300) comprises means for calculating an access message transmit power level and the base station having the lowest calculated access message transmit power level is selected. The invention is particularly applicable to $3^{rd}$ generation cellular communication systems such as UMTS.

12 Claims, 2 Drawing Sheets

100
—PRIOR ART—

SUBSCRIBER UNIT AND METHOD OF CELL SELECTION FOR A CELLULAR COMMUNICATION SYSTEM

FIELD OF THE INVENTION

This invention relates to a subscriber unit and method of cell selection for a cellular communication system and particularly a CDMA cellular communication system.

BACKGROUND OF THE INVENTION

In a cellular communication system each of the subscriber units (e.g. mobile stations) communicates with typically a fixed base station. Communication from the subscriber unit to the base station is known as uplink and communication from the base station to the subscriber unit is known as downlink. The total coverage area of the system is divided into a number of separate cells, each predominantly covered by a single base station. The cells are typically geographically distinct with an overlapping coverage area with neighbouring cells. FIG. 1 illustrates a cellular communication system 100. In the system, a base station 101 communicates with a number of subscriber units 103 over radio channels 105. In the cellular system, the base station 101 covers users within a certain geographical area 107, whereas other geographical areas 109, 111 are covered by other base stations 113, 115.

As a subscriber unit moves from the coverage area of one cell to the coverage area of another cell, the communication link will change from being between the subscriber unit and the base station of the first cell, to being between the subscriber unit and the base station of the second cell. This is known as a handover. Specifically, some cells may lie completely within the coverage of other larger cells.

All base stations are interconnected by a fixed network. This fixed network comprises communication lines, switches, interfaces to other communication networks, the base stations themselves and various controllers required for operating the network. A call from a subscriber unit is routed through the fixed network to the destination specific for this call. If the call is between two subscriber units of the same communication system the call will be routed through the fixed network to the base station of the cell in which the other subscriber unit currently is. A connection is thus established between the two serving cells through the fixed network. Alternatively, if the call is between a subscriber unit and a telephone connected to the Public Switched Telephone Network (PSTN) the call is routed from the serving base station to the interface between the cellular mobile communication system and the PSTN. It is then routed from the interface to the telephone by the PSTN.

A cellular mobile communication system is allocated a frequency spectrum for the radio communication between the subscriber units and the base stations. This spectrum must be shared between all subscriber units simultaneously using the system.

One method of sharing this spectrum is by a technique known as Code Division Multiple Access (CDMA). In a Direct Sequence CDMA (DS-CDMA) communication system, the signals are prior to being transmitted multiplied by a high rate code whereby the signal is spread over a larger frequency spectrum. A narrowband signal is thus spread and transmitted as a wideband signal. At the receiver the original narrowband signal is regenerated by multiplication of the received signal with the same code. A signal spread by use of a different code will at the receiver not be de-spread but will remain a wide band signal. In the receiver the majority of interference caused by interfering signals received in the same frequency spectrum as the wanted signal can thus be removed by filtering. Consequently a plurality of subscriber units can be accommodated in the same wideband spectrum by allocating different codes for different subscriber units. Codes are chosen to minimise the interference caused between subscriber units typically by choosing orthogonal codes when possible. A further description of CDMA communication systems can be found in 'Spread Spectrum CDMA Systems for Wireless Communications', Glisic & Vucetic, Artech house Publishers, 1997, ISBN 0-89006-858-5. Examples of CDMA cellular communication systems are IS 95 standardised in North America and the Universal Mobile Telecommunication System (UMTS) currently under standardisation in Europe.

In order to efficiently use the available resources it is essential that the cell selection is optimised. If subscriber units are served by cells which are not the best serving cell, the transmit powers will be increased in order to compensate and the interference will increase thereby reducing the capacity of the system. Cell selection is therefore very important both when setting up a new call or when selecting appropriate cells for handovers. UMTS and other $3^{rd}$ generation wideband-CDMA (W-CDMA) communication systems rely on a random access channel (RACH) for setting up calls. In W-CDMA, the physical RACH (PRACH) channel is used not only to set up calls, i.e. to send requests for a dedicated traffic channel, but also to transmit short data packets.

The ETSI document UMTS XX.07 UTRA Layer 1 Description. FDD Physical Layer Procedures, Version 0.2.0 gives a description of the cell selection and access procedure currently envisaged in UMTS. In summary, in the known wideband-CDMA random access method the mobile always communicates with a single base station, and this base station is selected on the basis of the maximum downlink pilot strength.

During the random access procedure, in its calculations of the necessary backoff after a failed access attempt, the mobile also makes use of so called dynamic persistence factor which is also published on the BCCH. This parameter, as described in the ETSI document "Mechanisms for Managing Uplink Interference and Bandwidth" Tdoc SMG2 UMTS-L1 683/98, is a means of controlling the uplink data flow, and it represents an indicator of congestion on the RACH. The dynamic persistence factor indicates the duration that a subscriber unit should wait before transmitting a new RACH following a failed access attempt.

However, known cell selection methods have significant disadvantages as they optimise the downlink performance without considering the uplink performance. This results in inefficient cell selection, which reduces the communication capacity of the communication system.

SUMMARY OF THE INVENTION

The inventor of the current invention has realised that cell selection based on only downlink pilot signal levels results in inefficient and sub-optimal cell selection. He has further realised that these effects can be mitigated by including uplink information in the cell selection process.

Accordingly to the present invention there is provided a subscriber unit for use in a cellular communication system having a plurality of base stations supporting at least said subscriber unit and transmitting a pilot signal and uplink characteristics information, the subscriber unit comprising:

receiving means for receiving the uplink characteristics information from a target set of base stations selected from set plurality of base stations; base station selection means for determining at least one serving base station in response to said uplink characteristics information; and transmitting means for accessing the cellular communication system through said at least one serving base station.

Preferably, the subscriber unit further comprises means for determining a received pilot signal quality indicator in the subscriber unit and the determination of the at least one serving base station is in response to both the uplink characteristics information and the pilot signal quality indicator.

According to different features of the invention the uplink characteristics information can for example be an uplink interference level, an uplink congestion indicator or a is a downlink transmit power level indicator.

According to one feature of the invention, the subscriber unit comprises means for calculating an access message transmit power level in response to said uplink characteristics information and the base station selection is in response to said calculated access message transmit power level.

According to a different aspect of the invention, there is provided a method of cell access in a cellular communication system having a plurality of base stations supporting at least said subscriber unit and transmitting a pilot signal and uplink characteristics information, the method comprising the steps of: receiving the uplink characteristics information from a target set of base stations selected from set plurality of base stations in the subscriber unit; determining at least one serving base station in response to said uplink characteristics information; and the subscriber unit accessing the cellular communication system through said at least one serving base station.

BRIEF DESCRIPTION OF THE DRAWINGS

An embodiment of the present invention is described below, by way of example only, with reference to the Drawings, in which.

DETAILED DESCRIPTION OF A PREFERRED EMBODIMENT

In a preferred embodiment of the invention, cell selection will not only be controlled by down link conditions but will also be determined in response uplink signal quality conditions.

The following description focuses on an embodiment compliant with the current approach for the standardisation of UMTS but it will be apparent that the invention is not limited to this application.

Figure 2:
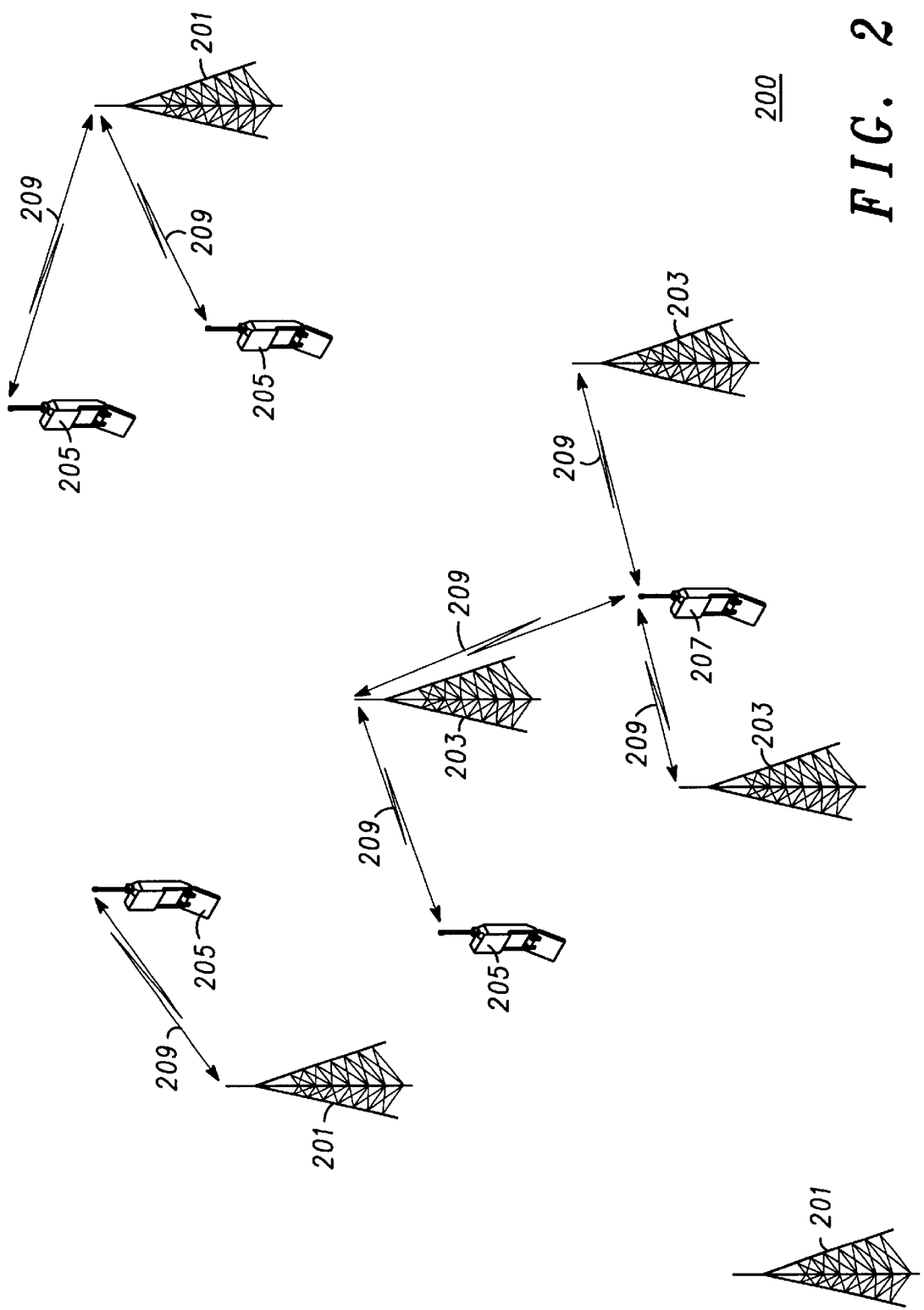
FIG. 2 illustrates a UMTS cellular communication system to which the current invention is applicable.

FIG. 2 illustrates a UMTS cellular communication system 200 to which the present invention applicable. The cellular communication system 200 comprises a large number of base stations 201, 203 serving a large number of subscriber units 205, 207. Typically, the base stations 201,203 will each cover a different geographical area although these areas typically will overlap. The base stations 201, 203 support a large number of subscriber units 205, 207 over radio channels 209, each subscriber unit 205,207 mainly being supported by the most appropriate base station 201,203 which is often the closest base station 201,203. When handing over from one cell to another, the subscriber unit 205, 207 can simultaneously be served by a plurality of base stations 201,203. The base stations suitable for a soft handover are in UMTS known as an active set.

A given subscriber unit can be in a situation where communication is only possible with one base station and the subscriber unit thus only has one candidate for a serving cell. However, in many cases, a subscriber unit 207 can potentially be served by one or more base stations out of a set of base stations. As an example, the subscriber unit 207 in FIG. 2 is located in the overlap of three cells served by three different base stations 203. In the example all three base stations can potentially support the communication from the subscriber unit 207 and one or more of these base stations can be selected as serving base station.

In the current embodiment each of the base stations transmit a downlink pilot signal. In the example, the subscriber unit 207 can receive the downlink pilot signal from all three potentially serving base stations 203. As well as transmitting the downlink pilot signal, the base stations also transmit broadcast information. In the current embodiment, this broad cast information includes uplink characteristics information which informs the subscriber units of certain characteristics of the uplink conditions. Specifically, the uplink characteristics information includes information of the uplink interference level, the uplink congestion and the downlink transmit power.

The uplink interference level has impact on how much transmit power the subscriber unit needs in order to be received at the base station. All other things being equal a signal from a subscriber unit has higher probability of being received at a base station having a low interference level than at a base station having a high interference level. The uplink congestion indicates how much traffic is using the current base stations. A specific example of a congestion indicator is thus the number of RACH attempts directed at this base station. Another example is the persistence factor suggested to be included in the broadcast information for UMTS.

Furthermore, the subscriber unit is capable of estimating the path loss to each of the base stations by making use of the receive level of the downlink pilot, which it measures, and the transmit level of that pilot, which it can read on the broadcast channel. Note that this is an estimate of the downlink path loss, however it is typically assumed the path losses in the uplink and downlink are identical or very close. The downlink transmit power level is thus an indirect indication of characteristics related to the uplink and is thus one example of uplink characteristics information. From its knowledge of the path losses to each base station in the target set and also of the uplink interference floors at each of these base station, the subscriber unit can calculate the required transmit power for the access message (the PRACH burst).

Figure 1:
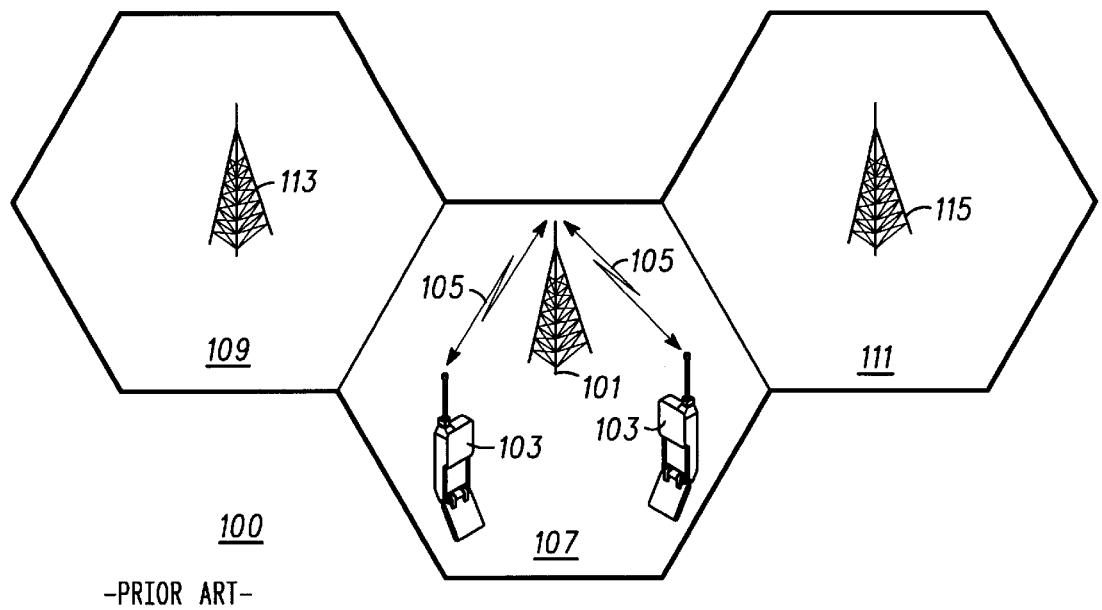
FIG. 1 is an illustration of a cellular communication system according to prior art.
Figure 3:
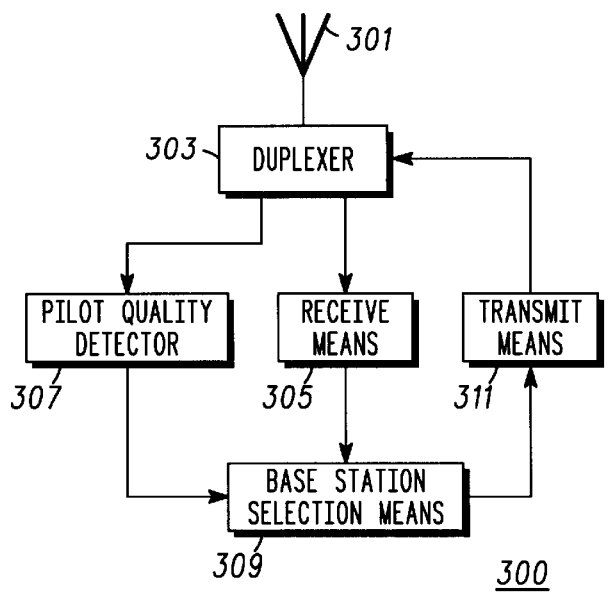
FIG. 3 is an illustration of a subscriber unit in accordance with an embodiment of the invention.

FIG. 3 illustrates a subscriber unit in accordance with an embodiment of the invention. The subscriber unit 300 comprises an antenna 301 connected to a duplexer 303. The duplexer is connected to receiver means 305 which are operable to receive the uplink characteristics information transmitted from the base stations on the broadcast channel. The receiver means will demodulate the information from the set of base stations, which are potential candidates for serving base station.

The subscriber unit 300 further comprise means 307 for determining a received pilot signal quality indicator which is an indicator for how well the downlink pilot signal is received at the subscriber unit. One example of a pilot signal quality indicator is the received pilot signal power level. The pilot signal quality indicator can be used for selecting the set of base stations which are considered as potential serving base stations and thus will be considered for serving cell selection.

The subscriber unit also comprise base station selection means 309, which are operable to determine one or more serving base stations. The base station selection means 309 are connected to the receiving means and the base station selection is performed in response to the uplink characteristics information received by the receiving means. Preferably the means 307 for determining a received pilot signal quality indicator are also connected to the base station selection means 309, and the base station selection is also in response to the pilot signal quality indicator.

The base station selection means 309 are connected to transmitting means 311, which are connected to the antenna 301 through the duplexer 303. The transmitting means 311 are operable to access the communication network through the one or more base stations selected by the base station selection means 309. This accessing of the communication system includes the initial random access (RACH) burst used for setting up a new call, a short data message access, a handover request or any other communication between the subscriber unit and the base station. The transmitting means 311 are also operable to transmit information of the base station selected by subscriber unit to the fixed network. In the preferred embodiment the subscriber unit selects a serving base station but the actual allocation of resources is performed in the fixed network. The subscriber unit is thus not guaranteed that the selected serving base station will be allocated.

According to the example embodiment, as well as considering the downlink pilot signal power level, the subscriber unit thus compares the required RACH transmit power and/or uplink interference floors and/or RACH congestion indicators in the candidate cells to determine the optimum serving base station. Thus the base station selection is based on both uplink and downlink performance giving a significantly more efficient cell selection.

The described cell selection procedure does not have to be carried out continuously in idle mode. In the preferred embodiment, the subscriber unit thus furthermore comprise means for instigating selection of the at least one serving base station in connection with performing a call setup. In this case cell selection is thus only carried out immediately before transmitting an uplink packet or setting up a new call. This approach reduces the power drain on the subscriber unit's battery, which is of major significance for mobile subscriber units.

According to one specific embodiment, cell selection is performed by calculating an uplink and a downlink performance indicator. The downlink performance indicator can be identical to the received pilot signal power level and the uplink performance indicator can be identical to the required transmit power of the PRACH burst, calculated in the subscriber unit. In this embodiment the serving base station is selected as the base station having both the best uplink and downlink performance indicator if such a base station exists. If no base station has both the best uplink and downlink performance indicator then a combined performance indicator is calculated and the serving base station is selected as the base station having the best combined performance indicator. An example of a combined performance indicator is to add the received downlink pilot signal power level and the uplink interference level. Alternatively, the uplink and downlink parameters can be weighted, offset or any function can be applied to uplink and downlink parameters in the calculation of the combined performance indicator.

In a slightly different embodiment the cell selection is performed differently when a call is being set up than when a short data message is sent. In UMTS, a short data message can be sent in a single RACH burst. According to this embodiment, if no cell has both the best uplink and downlink performance indicator then if a short data message is to be transmitted, the serving base station will be selected as the cell having the best uplink performance. However, if instead a call is being setup, the serving base station will be selected as the base station having the best combined performance.

This approach has the following advantage: When a short data message is sent over the RACH, the uplink quality is the most important factor for a successful detection of the message. This is because the only information transmitted in the downlink in this case is an acknowledgement message, which contains a small number of bits and does not require a significant system resource. Consequently, selecting the serving base station as the base station with the best uplink performance optimises the usage of the system resource. In the other case, when a RACH burst is employed for setting up a call, especially a symmetrical circuit switched call such as a duplex voice call, both the uplink and the downlink quality are of prime importance. Therefore, selection of the serving base station on the basis of the combined performance will minimise the required system resource in this case.

Preferably, base station selection is performed based on a calculated transmit power level for an access message. As previously described, the subscriber unit can calculate a transmit power level for an access message (a RACH burst) by use of the uplink characteristics information. Specifically, the RACH power level can be calculated as the downlink transmit power level (read on the BCCH)−received pilot power level (measured by subscriber unit)+uplink interference level (read on BCCH)+required signal to noise ratio (known as a function of bit rate or read on BCCH). The approach thus assumes correlation between the uplink and downlink path losses.

The transmit power level for an access message can thus be seen as either an uplink performance indicator reflecting how much power is required to access a given base station. Alternatively, it can be seen as a combined performance indicator reflecting both the prevalent conditions on the uplink and the downlink.

In accordance with one embodiment of the invention, base station selection is performed by determining the uplink transmit power level for an access message for all base stations in the set, and selecting the base station having the best performance, i.e. the lowest power level as serving base station.

The invention thus provides a better balance between downlink and uplink quality criteria in cell selection resulting in a more efficient utilisation of resources and thus increased capacity of the cellular communication system.

As a specific example of an advantage obtained by the invention consider a simple example of two cells with a downlink signal power level difference of 1 dB and an uplink interference level difference of −10 dB. This is a typical case when one of the cell have a zero load of the RACH, and the other cell having a congested RACH. If the subscriber unit needs to send a short message (e.g. email, SMS), the currently proposed UMTS cell selection approach will select the first cell for the message transmission. The message is likely to suffer from collisions in the congested RACH, and hence re-transmissions thereby increasing the resource demand. According to the described embodiment, the second cell will be chosen instead and the message is much more likely to be detected first time in the unloaded RACH. It follows that the proposal offers a reduction in both transmission delay and created interference.

I claim:

1. A subscriber unit for use in a cellular communication system having a plurality of base stations supporting at least said subscriber unit and transmitting a pilot signal and uplink characteristics information, the subscriber unit comprising:

receiving means for receiving the uplink characteristics information from a target set of base stations selected from said plurality of base stations;

means for calculating, when in idle mode, a random access message transmit power level of a random access message in response to said uplink characteristics information;

base station selection means for determining, when in idle mode, at least one serving base station in response to said calculated random access message transmit power level; and transmitting means for exiting idle mode by accessing the cellular communication system through said at least one serving base station by transmitting the random access message at the calculated random access message transmit power level.

2. A subscriber unit as claimed in claim 1 further comprising means for determining a received pilot signal quality indicator in the subscriber unit and wherein the determination of the at least one serving base station is in response to both the uplink characteristics information and the pilot signal quality indicator.

3. A subscriber unit as claimed in claim 1 wherein said uplink characteristics information is an uplink interference level.

4. A subscriber unit as claimed in claim 1 wherein said uplink characteristics information is an uplink congestion indicator.

5. A subscriber unit as claimed in claim 1 wherein the target set of base stations are determined in response to a received pilot signal power level.

6. A subscriber unit as claimed in claim 1 wherein the at least one serving base station is selected in response to only the uplink characteristics information for a short data message and in response to both the uplink characteristics information and the received pilot signal quality indicator for a call setup.

7. A subscriber unit as claimed in claim 1 further comprising means for instigating selection of the at least one serving base station in connection with transmitting an access message.

8. A cellular communication system comprising at least one subscriber unit as claimed in claim 1.

9. A method of cell access in a cellular communication system having a plurality of base stations supporting at least said subscriber unit and transmitting a pilot signal and uplink characteristics information, the method comprising the steps of:

receiving the uplink characteristics information from a target set of base stations selected from said plurality of base stations in the subscriber unit;

calculating, when in idle mode, a random access message transmit power level of a random access message in response to said uplink characteristics information;

determining, when in idle mode, at least one serving base station in response to said calculated random access message transmit power level; and the subscriber unit exiting idle mode by accessing the cellular communication system through said at least one serving base station by transmitting the random access message at the calculated random access message transmit power level.

10. A method as claimed in claim 9 further comprising the step of determining a received pilot signal quality indicator in the subscriber unit and wherein the determination of the at least one serving base station is in response to both the uplink characteristics information and the pilot signal quality indicator.

11. A method as claimed in claim 9 wherein the step of determining the at least one serving base station comprises the steps of determining an uplink performance indicator in response to the uplink characteristics information, a downlink performance indicator in response to the pilot signal quality indicator, and a combined performance indicator in response to both the uplink characteristics information and the pilot signal quality indicator, and if a base station has both a better uplink performance indicator and a better downlink performance indicator selecting that base station as the at least one serving base station; and otherwise selecting the base station having the best combined performance indicator as the at least one serving base station.

12. A method as claimed in claim 9 wherein the step of determining the at least one serving base station comprises the steps of determining an uplink performance indicator in response to the uplink characteristics information, a downlink performance indicator in response to the pilot signal quality indicator, and a combined performance indicator in response to both the uplink characteristics information and the pilot signal quality indicator, and if a base station has both a better uplink performance indicator and a better downlink performance indicator selecting that base station as the at least one serving base station; and if no base station has both a better uplink performance indicator and a better downlink performance indicator then selecting the base station having the best uplink performance indicator as the at least one serving base station for a short data message; and otherwise selecting the base station having the best combined performance indicator as the at least one serving base station.

* * * * *